June 20, 1944. D. KATZ 2,351,618
LECTURE AND PROJECTION DESK OF THE SCRIPTOSCOPE TYPE
Filed July 2, 1942
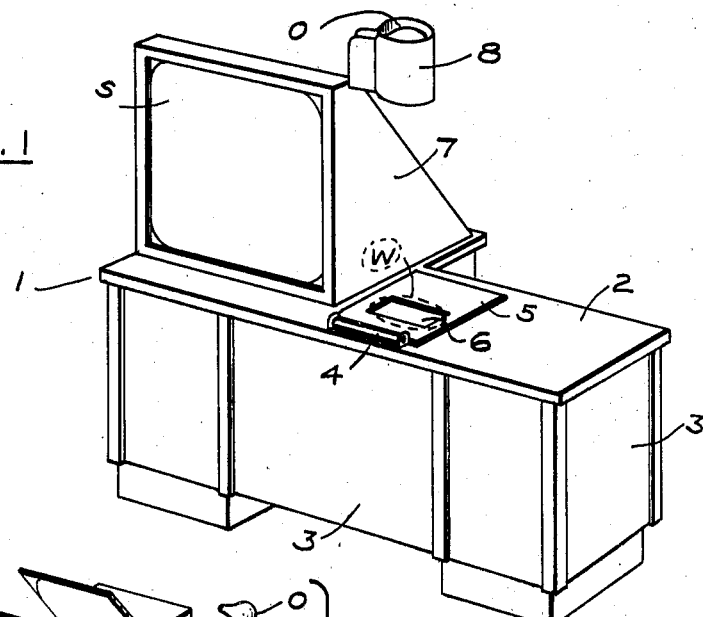
FIG. 1
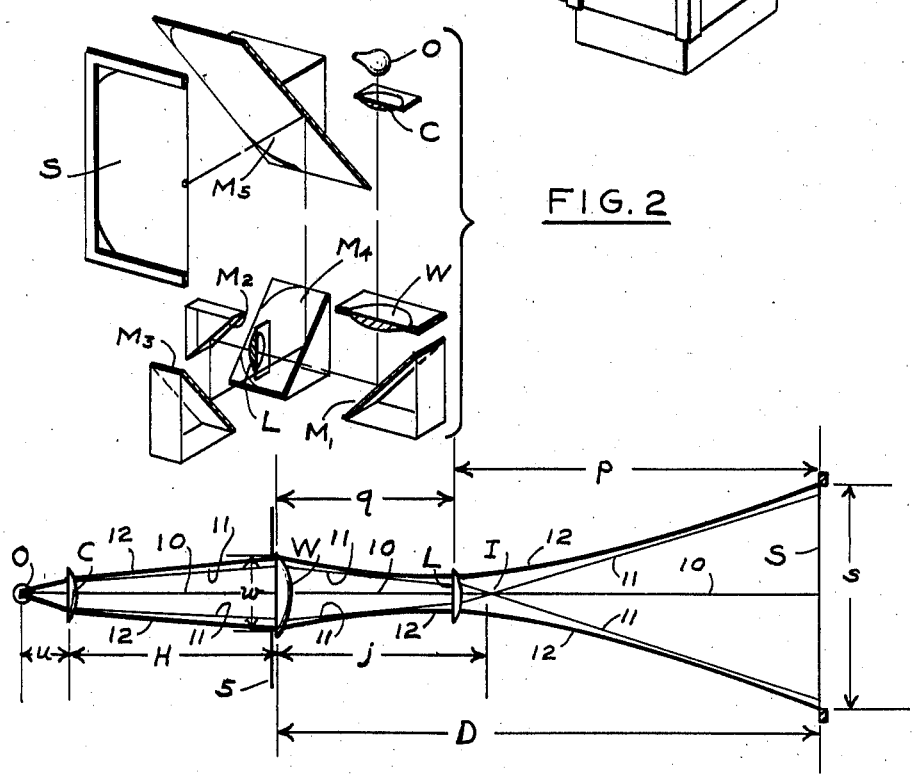
FIG. 2
FIG. 3
David Katz
INVENTOR.

Patented June 20, 1944

2,351,618

UNITED STATES PATENT OFFICE 2,351,618

LECTURE AND PROJECTION DESK OF THE SCRIPTOSCOPE TYPE

David Katz, Wilmington, Del., assignor to The Scriptoscope Company, Wilmington, Del., a corporation of Delaware Application July 2, 1942, Serial No. 449,441

2 Claims. (Cl. 88—24)

This invention relates to improvements in lecture and projection desks of the Scriptoscope type. The principal characteristic of the Scriptoscope is that it possesses facilities whereby writing done on top of the desk by a lecturer is simultaneously and automatically projected through the interior of the desk upon a translucent screen built into the body of the desk in a position to be visible to the audience while the latter is facing the lecturer. Various forms of the Scriptoscope and the details of their structure are described in my U. S. Patents Nos. 2,181,133, 2,181,134 and 2,238,267.

My present invention is concerned primarily with the problem of increasing the sharpness of definition of the projection on the screen and of improving generally the field and visibility of the projection.

In my copending application Serial No. 305,864, filed November 24, 1939, and which has become Patent No. 2,309,120, dated January 26, 1943, I have shown that the sharpness of definition may be increased by special construction of the illuminating system, using a total of three positive lenses outside the cabinet of the Scriptoscope. Now, according to my present invention, I find that the sharpness of definition can also be controlled, and to some extent improved by judicious selection of the two principal lenses within the Scriptoscope body, that is the writing panel and the focussing lens, as more fully discussed and explained hereinbelow.

For clearer exposition, reference is made to the annexed drawing which forms part of this specification.

Fig. 1 shows in perspective one form of the Scriptoscope, with the projection screen entirely above the level of the lecturer's writing panel, to facilitate display of the writing to the remote corners of a lecture room.

Fig. 2 is a three-dimensional diagram showing the relative positions of the essential optical elements in the form of Fig. 1. In this figure, half of each lens or mirror is cut away by a vertical plane to expose clearly the path of the light beam, and the back of each mirror is further provided with a fictitious rectangular support to bring out clearly its position in three-dimensional space.

Fig. 3 is a simplified diagram showing the optical relationship of the essential optical elements of the Scriptoscope system in general, omitting all mirrors so that the general direction of the beam of light throughout the system may be represented as progressing along a straight, horizontal axis.

Referring now to Fig. 1, the Scriptoscope there shown comprises a cabinet 1 in the form of a desk having a desk top 2 and walls 3, 3. In the top an opening is cut through and a plano-convex lens W is inserted, with the plane surface uppermost and flush with the level of the desk top. Stretched over this plane surface is a sheet of Cellophane or similar transparent material, which unwinds from a continuous roll hidden under the eave of the desk and is wound up as it is consumed upon a roll 4 near the front edge of the desk. Covering the sheet of Cellophane and plano-convex lens is a sheet of cardboard or similar opaque material 5 with an aperture 6 cut out to fit over the plane surface of lens W and to delimit the exposed area thereof. This aperture, which will hereinafter be referred to as the "window" is generally of substantially rectangular shape, with a diagonal equal, more or less, to the diameter of the lens W.

At one end of the cabinet 1 the superstructure 7 rises from the interior of the cabinet and supports at the front face thereof the translucent screen S, generally made of ground glass or shadow-transmitting, thru-projection cloth. In the particular design shown in Fig. 1, the frame of the superstructure serves also to support the lighting unit 8 of which only the outer shell or opaque shade is shown in Fig. 1.

Turning now to Fig. 2, the lighting unit as seen there consists of a lamp O, and a condensing lens C. However, instead of this simple condenser, a more complex system consisting of three positive lenses in succession may be employed, as more fully described and claimed in my copending application, Serial No. 305,864, referred to above. In the subsequent discussion, the symbol C is to be understood as a generic symbol for either type of condenser or any other system which will achieve the same result.

The light from the lamp O is thus condensed by C and directed as a slightly diverging beam unto the "writing panel" W. In Fig. 2 only the axis of this beam has been indicated, to facilitate tracing the path thereof without confusing the diagram.

Having passed lens W into the interior of the desk, the beam, now converging, strikes the mirror $M_1$ and is reflected by it towards the center of the focussing lens L. From there the beam continues until it hits in succession mirrors $M_2$, $M_3$, $M_4$ and $M_5$, the latter finally reflecting it unto the screen S. As will be shown later, the beam of light is at a minimum cross section in the vicinity of L, and may therefore be considered as diverging from this vicinity on, until it just about covers the area of the screen S when it finally impinges upon the latter.

In other forms of the Scriptoscope only 3 mirrors are employed between W and S, or even only one mirror, and their mutual disposition is entirely different. The screen S itself may be in a different position, vertical or somewhat inclined, and partly or totally below the level of the desk top. (For the purpose of this discussion and throughout this specification, the "desk top" will be used to signify that portion of the desk which supports the writing panel W, and as its level is to be taken the level of the plane surface of W.) Details of these other various forms have been set forth in my earlier patents above referred to. Therefore, for the sake of theoretical investigation into the essential properties and relationships of the various lenses with respect to the source of light on the one hand and the screen on the other hand, an idealized simple diagram, as in Fig. 3, must be resorted to.

In Fig. 3, the optical system of the Scriptoscope has been simplified by omitting all mirrors. The path of the axis of the beam of light thus becomes a straight line facilitating analysis and theoretical discussion. In this discussion, all distances are to be understood as measured along the axis of the beam of light.

In this figure, the axis of the beam of light is represented by the central line 10, running thru the system of essential optical elements, which comprises the lamp O, condenser C, writing panel W, focussing lens L, and screen S. In addition, the pencil of light from a single point on the filament is outlined by the pair of fine broken lines 11, 11 running from O to S. It will be noted that each pencil, although originating in a single point at O is eventually spread out practically over the entire surface of S. The pencil crosses itself at I and forms there a sharp image of the filament.

If the light came from a true geometrical point, the entire beam of light from the filament would be coincident with this pencil and its minimum cross section would be at I. However, the filament is not infinitesimal in cross section. The actual beam of light is therefore a bundle of an infinite number of pencils whose axes are somewhat inclined to each other. This factor, together with the effect of spherical aberration in the various lenses, imposes upon the entire beam of light a smoothly curved somewhat hyperboloid boundary, represented by the heavy lines 12, 12. Between W and S, this hyperboloid beam has its minimum cross section far in advance of the point I, and is generally, according to my observation, at a point from W about 0.6 to 0.8$j$, $j$ being the distance from W to I.

I find that at this point of minimum section, the light of the beam is reasonably uniform throughout the section, whereas at I, the cross section consists of an intensely bright image of the filament surrounded by a wide field of weaker light.

Now, I have found to my great surprise that the sharpness of definition of the projection on the screen, depends not only on putting the lens L in correct position for focussing, but also on the relation of the focal length of this lens L to that of W. To make this point clearer, let us assume that L has a focal length of $f$ inches, and that upon adjusting its position to focus clearly on the screen any writing done on the writing panel W, the distances of lens L from W and S, respectively, measured along the axis of the beam of light, are $q$ and $p$. Then by the elementary lens law, $$\frac{1}{p}+\frac{1}{q}=\frac{1}{f} \quad (1)$$

Since the sum $p+q$ represents the total distance D from W to S (measured along the axis of the beam of light), and since this distance is fixed once the cabinet is built, it is clear that for any selected focal length $f$ for lens L, there is only one correct position $q$. (There is also one complementary value, equal to $D-q$, but since this would give diminution of image instead of desirable magnification, it will be ignored in this discussion.) To give maximum focussing clearness, lens L must be in this position $q$.

However, by selecting lenses of different $f$-values, the value of the optimum $q$ may be correspondingly varied.

Now, I have found that further improvement in sharpness of definition on the screen may be achieved if $f$ is selected so that the optimum $q$ falls in the vicinity of the point where the cross section of the beam is a minimum. In other words, $f$ should be selected so as to give $$q=(\text{fr. } 0.6 \text{ to } 0.8)j \quad (2)$$

Since the value $j$ itself is determined by the focal length of lens W, which will here be designated as F, it is clear that $f$ is a function of F. According to my observations, best results in sharpness of projection demand that $f$ should not exceed F and should preferably not fall below 0.6F. In other words, $$f=(\text{fr. } 0.6 \text{ to } 1.0)F \quad (3)$$

For best results $$f=(0.7 \text{ to } 0.85)F \quad (4)$$

In practice, the ideal value arrived at by mathematical computation may not always be obtained, since the lenses W and L must often be selected from manufacturer's stock sizes, whose focal lengths generally fall into certain standard groups. However, if the selected lenses give a ratio within the ranges indicated in the above discussion, satisfactory results will generally be obtained.

The following table, representing results of actual experimentation, will show how the application of Formulas 3 and 4 works out in practice.

| $f$ | F | $f/F$ | Results on screen |
|---|---|---|---|
| 12 | 19 | 0.63 | Fair. |
| 11½ | 12 | 0.96 | Good. |
| 11½ | 16 | 0.72 | Excellent. |
| 20 | 15 | 1.33 | Unsatisfactory. |
| 18 | 15 | 1.20 | Do. |
| 18 | 18 | 1.00 | Fair. |
| 15 | 18 | 0.83 | Excellent. |
| 15 | 19 | 0.79 | Do. |

A second principle discovered by me as essential to the successful performance of the Scriptoscope is that the focal length F of lens W should have a certain minimum value compared to the diameter of lens W or to the diagonal or largest diameter of the "window" imposed upon W. In other words, the value F should bear a certain minimum ratio to the largest diameter of the writing area set aside for projection.

Let $w$ designate the diagonal or maximum diameter of the writing area, and let F as before designate the focal length of W. Now, let R represent the ratio F/w. I find that for the best results R should have a value larger than 1.5, and preferably at least 1.7.

If a value of R=1.5 is employed, for instance if W has a diameter of 8" and a focal length of 12", good projection may still be obtained, but only writing within a certain limited circle on the surface of W is so projected. By the use of a cardboard 5 or similar object cut out to define a certain limited open area upon W, say a rectangular area of 5" by 6", it is found that writing in the extreme corners of the window does not show up on the screen at all. In other words, the open area of the rectangular window shows up on the screen as a rectangle with rounded off corners. The maximum that could be projected on the screen in this particular case was a diagonal of about 7", but the exact size of this maximum diagonal will depend generally on the structure of the illuminating system and its height H above W.

On an average, it may be formulated as a principle, that full projection will be obtained if R is made at least 1.7, say $$R = 1.7 \text{ to } 2.5 \tag{5}$$

Higher values for R are permissible, even as high as 3, but the higher values of R imply either an unduly diminished writing area ("window") or else an increased length of focus (F) for lens W. But inasmuch as $f$ (the focal length of L) must be kept at about 0.6F to 1.0F, and inasmuch as with a given desired magnification $m$, $q$ and $p$ are directly proportional to $f$, thus $$p = (m+1)f, \qquad q = \frac{m+1}{m}f \tag{6}$$

it will be clear that the total distance $D=(p+q)$ will increase when a large F is selected. The longer distance D implies a larger cabinet and since it is not desirable to increase the size of the cabinet out of proportion to surrounding furniture in the room where it will be used, it follows that the best manner for satisfying the requirements of R is by adhering to the limits indicated in Equation 5, or to keep R as nearly as possible to a value of about 2.

It will be clear, of course, that where the lens W itself has a focal-length-to-diameter ratio within the preferred limits of R above indicated, the problem is automatically satisfied. But it is not necessary to limit the diameter of W as long as the area exposed for use by the writer is limited off by a "window" as above indicated to give a diagonal or maximum diameter within the limits of Equation 5.

It will be further understood that the principles laid down here for good projection or sharp definition are not incompatible with the remedy proposed in my copending application Serial No. 305,864, but may be used in conjunction therewith to produce a cumulative effect.

Many other permissible variations and modifications will be apparent to those skilled in this art.

Although I have illustrated the above discussion with a unit of furniture shaped like a desk at which the lecturer would be sitting down, it will be clear that the principle of this invention is the same if the cabinet has any other convenient shape or appearance, for instance that of a pulpit at which the lecturer would be standing up. Therefore, in the claims below the term "desk" should be understood in a broad sense as referring to any cabinet adapted for use by a lecturer while addressing his audience.

I claim:

1. A projection apparatus of the Scriptoscope type comprising in combination a lecture desk; a transparent writing panel in the top of the desk; illuminating means outside the desk, mounted in position to send a beam of light through said writing panel into the interior of the desk; a plano-convex lens associated with said writing panel for concentrating said beam of light as it passes into the interior of the desk, forming an image of the light source at a point within the desk; reflecting means within the interior of the desk positioned to intercept said beam of light and to project it unto a shadow-transmitting screen fitted into the structure of the desk; and a focussing lens within the desk situated within the path of the beam of light and positioned to focus onto said screen rays of shadow originating in the plane of said writing panel; said focussing lens being so selected as to have a focal length between 0.6 and 1.0 times the focal length of the plano-convex lens aforementioned, and the latter in turn being so selected as to have a focal length at least 1.7 times the length of the maximum diameter of the writing panel.

2. A projection apparatus of the Scriptoscope type comprising in combination a lecture desk; a transparent writing panel in the top of the desk; illuminating means outside the desk, mounted in position to send a beam of light through said writing panel into the interior of the desk; a plano-convex lens associated with said writing panel for concentrating said beam of light as it passes into the interior of the desk, forming an image of the light source at a point within the desk; reflecting means within the interior of the desk positioned to intercept said beam of light and to project it unto a shadow-transmitting screen fitted into the structure of the desk; and a focussing lens within the desk situated within the path of the beam of light and positioned to focus onto said screen rays of shadow originating in the plane of said writing panel; said focussing lens being so selected as to have a focal length between 0.7 and 0.85 times the focal length of said plano-convex lens, and the latter in turn being so selected as to have a focal length between 1.7 and 2.5 times the length of the maximum diameter of the writing area set aside for projection.

DAVID KATZ.